(12) United States Patent
Zwollo et al.

(10) Patent No.: US 7,000,478 B1
(45) Date of Patent: Feb. 21, 2006

(54) COMBINED PRESSURE AND TEMPERATURE TRANSDUCER

(75) Inventors: Cris Ruiz Zwollo, Enschede (NL); Paul Gennissen, Enschede (NL); Roger M. Appelo, Kallenkote (NL)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 11/072,613

(22) Filed: Mar. 4, 2005

Related U.S. Application Data

(60) Provisional application No. 60/648,682, filed on Jan. 31, 2005.

(51) Int. Cl.
*G01L 19/04* (2006.01)
(52) U.S. Cl. ...................................................... 73/708
(58) Field of Classification Search .................. 73/708, 73/714, 753, 754, 755, 756; 374/143
See application file for complete search history.

(56) References Cited

U.S. PATENT DOCUMENTS 4,797,007 A * 1/1989 Elmore, III .................. 374/143

6,742,395 B1  6/2004  Borgers et al.

* cited by examiner

*Primary Examiner*—William Oen
(74) *Attorney, Agent, or Firm*—Russell E. Baumann; Frederick J. Telecky, Jr.

(57) ABSTRACT

A combined pressure and temperature transducer (10) particularly adapted for high temperature fluids has a sensing element assembly mounted at the tip of a tubular probe (20) which is arranged for placement in a fluid flow path. A sensing element (12) includes a pressure responsive diaphragm (12g) closing the open end of the tubular probe and being provided with piezo-resistive gauge elements bonded to the diaphragm. Wires are bonded between the gauge elements and a first, heat resistant, printed circuit board (PCB). The first PCB, together with the piezo-resistive elements, form a Wheatstone bridge. An inner connector (26) mounts elongated, axial stress absorbing contacts connecting the first PCB at one end of the inner connector with a second printed circuit board (PCB) mounted at the opposite end of the inner connector physically removed from the sensing element and first PCB and away from the fluid flow path. The second PCB mounts signal conditioning and amplifying electronics. An outer connector (38) and housing (42) mounts the second PCB and provides an electrical interface with transducer.

10 Claims, 7 Drawing Sheets

COMBINED PRESSURE AND TEMPERATURE TRANSDUCER

Benefit is claimed under 35 USC Section 119 (e) (1) of U.S. Provisional Application No. 60/648,682, filed Jan. 31, 2005.

FIELD OF THE INVENTION

This invention relates generally to a combined pressure and temperature transducer and more particularly to such transducers using strain gauge technology for sensing both temperature and pressure change to produce a signal related to such change and employing electronics for processing and amplifying the signal.

BACKGROUND OF THE INVENTION

An example of a prior art pressure transducer using strain gauge technology of the type with which the invention is concerned is disclosed and claimed in U.S. Pat. No. 6,742,395, which issued Jun. 1, 2004 to the assignee of the present invention, the subject matter of which is incorporated herein by this reference. In that patent, a transducer is described having a tubular port fitting formed with a fluid receiving opening at one end and a closed, integrally formed diaphragm at an opposite end. A support member having an apertured flat end wall is locked onto the pedestal end in a selected orientation with the aperture aligned with strain gauge sensor elements bonded to the diaphragm. A circuit board is mounted on the support member and mounts electronic components for conditioning and amplifying sensor signals. Wires are bonded both to the strain gauge sense elements and to circuit board pads on the circuit board and then encapsulated by silicone gel.

A cover, attachable to the support member is used to mount helical spring contact members to position them for engagement with landing zones of the circuit board. The helical spring contact members are enclosed within longitudinally extending cavities in the cover aligned with the landing zones when the cover is attached to the support member. An elastomer environmental O-ring seal or gasket member is received in a circumferential groove in the surface of the cover. A generally cup-shaped EMC shield is disposed in a chamber formed on a side of the cover facing the circuit board, the shield provided with tabs which extend outwardly through openings in the side-wall of the cover beyond the outer periphery of the side-wall. The cover is locked onto the support member and the helical spring contact members, received in the longitudinal cavities in the cover, have one end protruding from the cover. A combined electrical connector and hexagonal metal housing member is disposed over the cover. The connector has bent portions of terminals acting as contact landing zones for electrical connection with the helical contact spring members that protrude from the cover member to electrically connect the terminals to the circuit board landing zones. The EMC shield tabs are spring biased into electrical connection with the metal housing member. The housing member and connector apply a selected load to the elastomer gasket member, the housing being welded around its lower periphery to a support flange attached to the port fitting to form a fluid seal and to maintain the selected loading on the elastomer gasket member.

Transducers made in accordance with the noted patent are highly effective and are widely used; however, they are not suitable for use with high temperature fluids, for example fluids at temperatures of up to 180 degrees C.

SUMMARY OF THE INVENTION

It is an object of the present invention to provide a condition sensing transducer which can be used with high temperature fluids, for example, up to 180 degrees C. Another object is the provision of a transducer which can monitor both pressure and temperature. Yet another object of the present invention is the provision of a combined pressure and temperature transducer having good dynamic response, both fast and accurate.

Briefly stated, a combined pressure and temperature transducer particularly useful for monitoring the pressure and temperature of a fluid at elevated temperatures, for example temperatures of the fluid, such as gas, reaching 180 degrees C., in accordance with the preferred embodiment of the invention comprises a sensing element received at one end of a tubular probe member. A first heat resistant printed circuit board (PCB) is disposed within the tubular probe member and is attached to a support ring which, in turn, is attached to the sensing element. The sensing element has piezo-resistive strain gauges glass bonded thereto that, together with the first PCB, form a Wheatstone bridge to enable temperature and pressure measurement. The first PCB includes wire bond pads to make connection with the strain gauges and landing pads to make connection with contact members to be described.

A second, larger, PCB, mounting an ASIC and associated passive elements, is provided in the transducer but is physically separated from the first PCB. Electrical interconnection between the first and second PCBs is effected by an inner connector comprising elongated, axial strain absorbing, contact members isolated by a plastic element inserted into the tubular probe member. The axial strain absorbing contact members absorb axial strain caused by the varying precision of the parts as well as the strain caused by changing lengths of the contact members resulting from varying temperatures. The second PCB is placed on top of the inner connector and an EMC shield and cover are disposed on top of the second PCB. Helical springs provide electrical connection between the second PCB and an outer connector assembly comprising a plastic connector body with co-molded terminal pins and a hexagonal metal housing. In accordance with the preferred embodiment, the tubular probe member is provided with an external threaded portion and a gas tight sealing surface to facilitate placement of the sensing element directly in a conduit having a fluid flow path. This placement facilitates fast and accurate response.

The tip of the sensor is designed to withstand high temperatures of up to 180 degrees C. while at the same time the conditioning electronics are physically separated by the contacting system described above, using ambient temperature to cool the electronics to acceptable temperatures.

Additional objects and features of the invention will be set forth in part in the description which follows and in part will be obvious from the description. The objects and advantages of the invention may be realized and attained by means of the instrumentalities and combinations particularly pointed out in the appended claims.

BRIEF DESCRIPTION OF THE DRAWINGS

The accompanying drawings which are incorporated in and constitute a part of the specification, illustrate a preferred embodiment of the invention and, together with the description, serve to explain the objects, advantages and principles of the invention. In the drawings.

DETAILED DESCRIPTION OF PREFERRED EMBODIMENT

Figure 1:
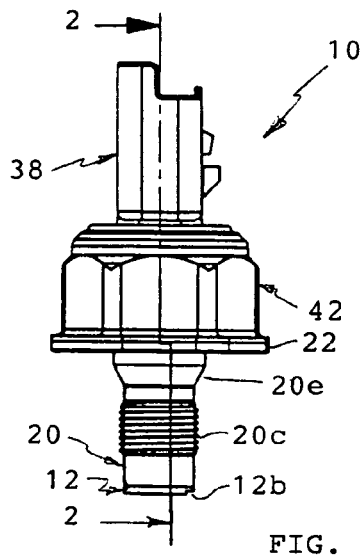
FIG. 1 is an elevational view of a combined pressure and temperature transducer made in accordance with the preferred embodiment of the invention.
Figure 4:
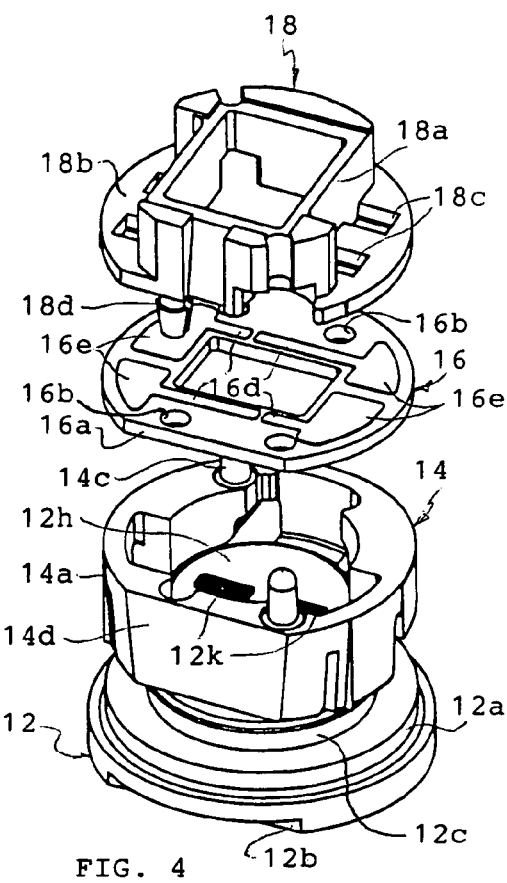
FIG. 4 is an exploded perspective view of the sensing element assembly of FIG. 3.
Figure 2:
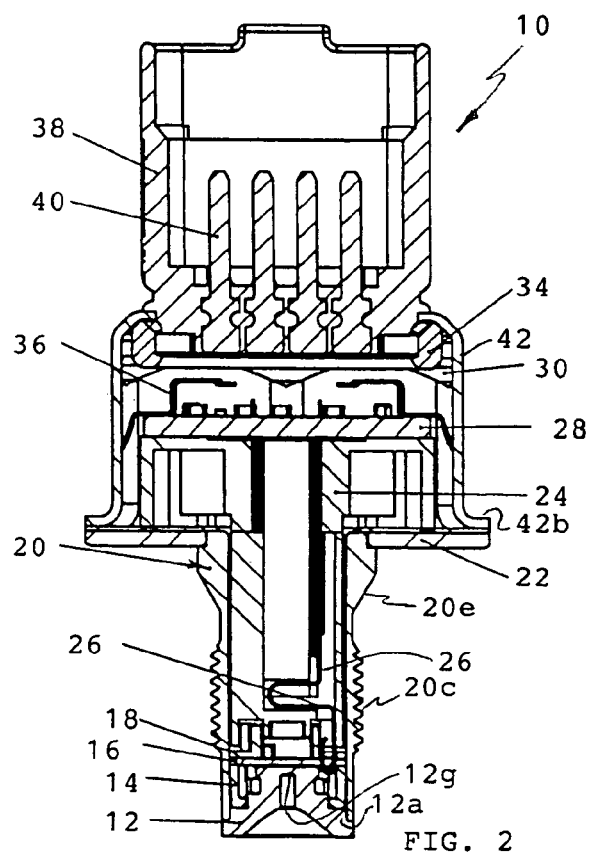
FIG. 2 is a cross section taken on line 2—2 of FIG. 1.
Figure 5:
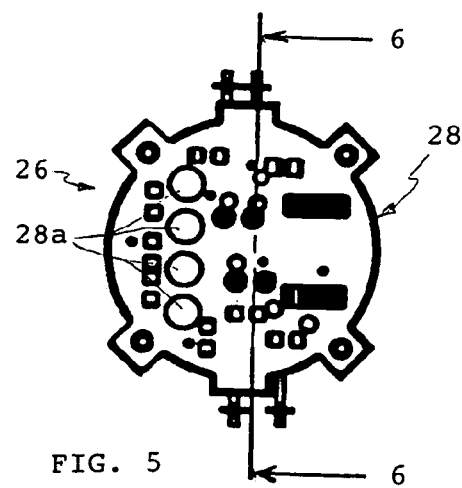
FIG. 5 is a top plan view of an electronic conditioning and amplifying PCB and an exploded view of an inner connector of the FIG. 1 transducer.
Figure 3:
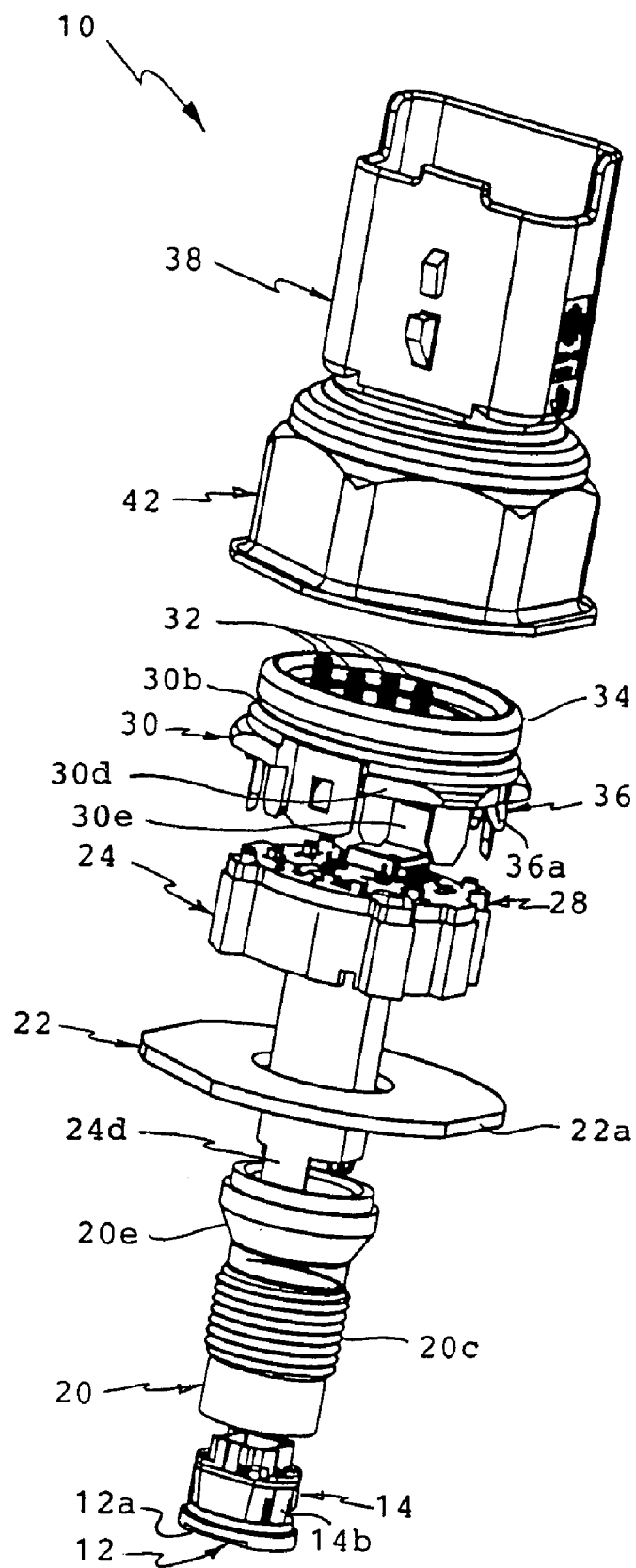
FIG. 3 is an exploded perspective view of the FIGS. 1, 2 structure.
Figure 6:
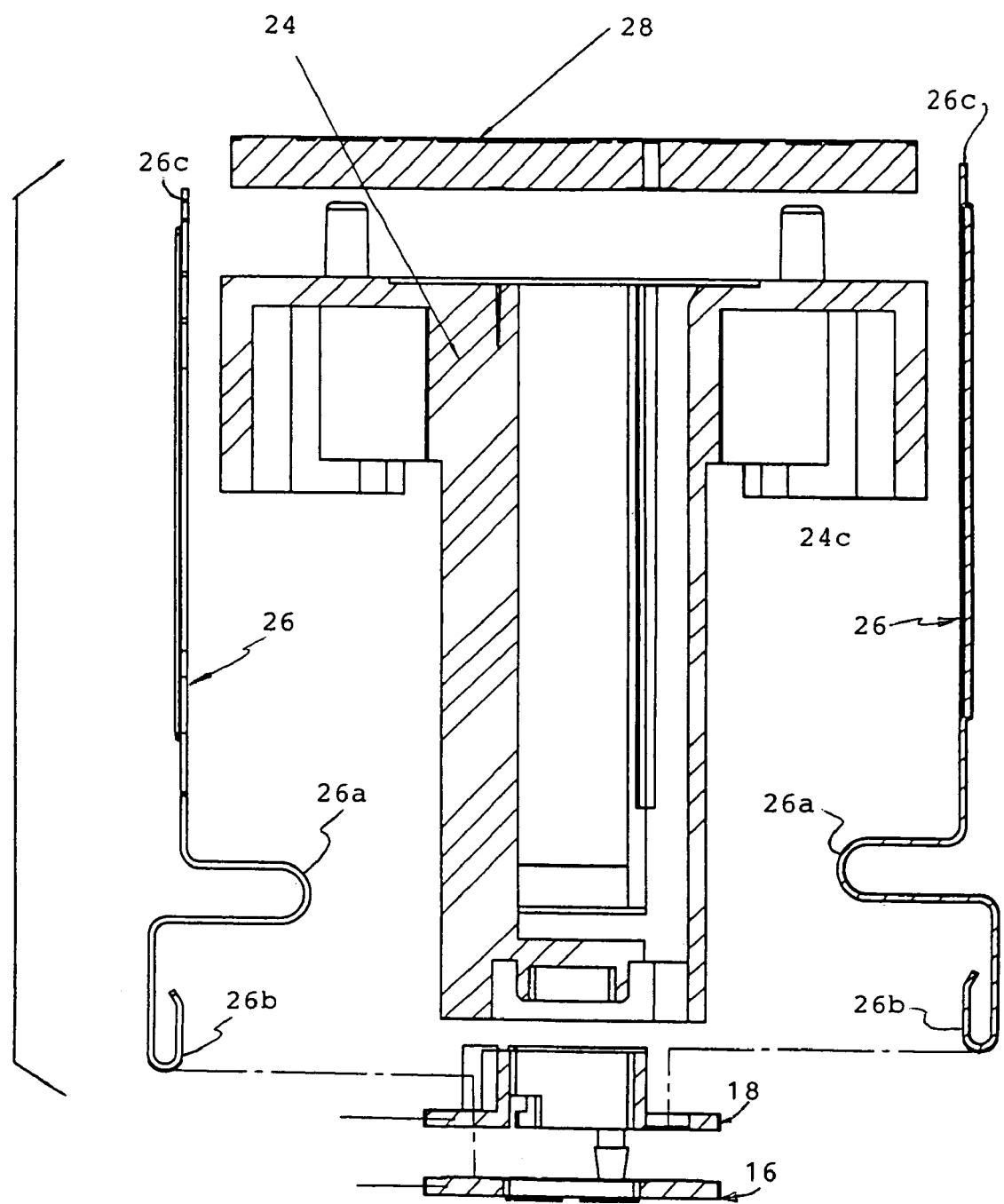
FIG. 6 is an enlarged scale, cross section taken on line 6—6 of FIG. 5.
Figure 7:
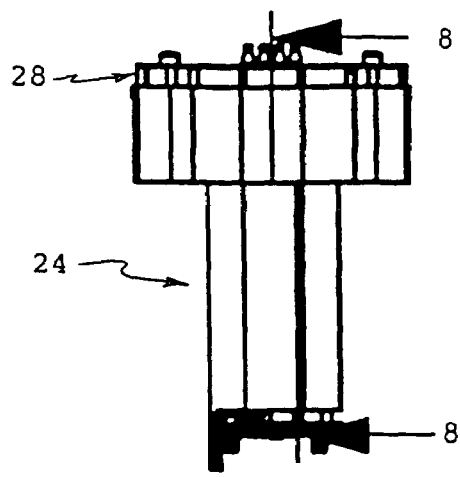
FIG. 7 is a reduced scale, elevational view of the assembled connector and PCB of FIGS. 5, 6.
Figure 8:
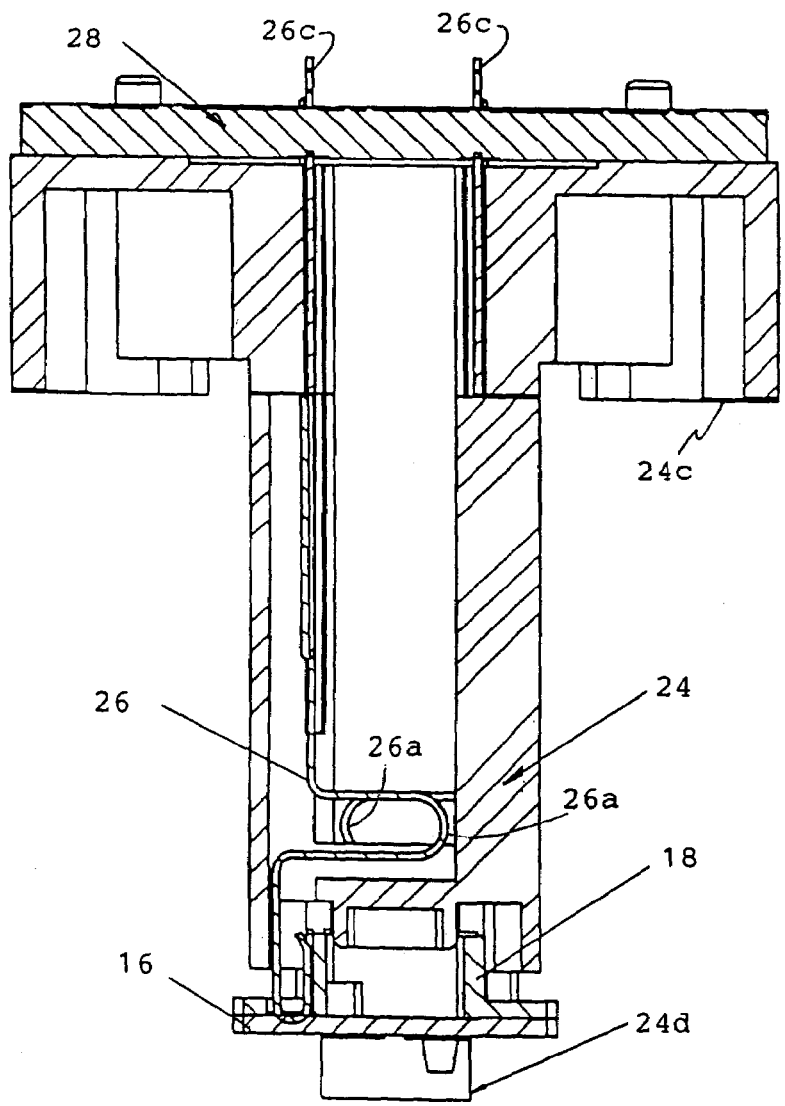
FIG. 8 is an enlarged scale, cross section taken on line 8—8 of FIG. 7.
Figure 9:
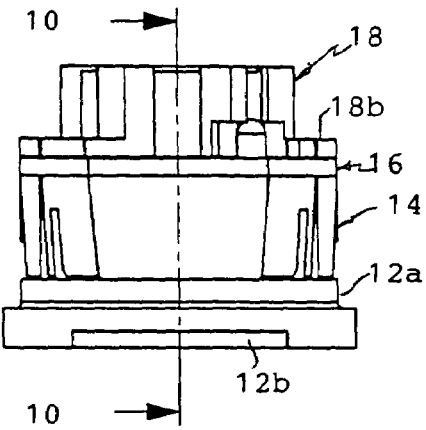
FIG. 9 is an elevational view of the assembled sensing element assembly shown in FIG. 4.
Figure 11:
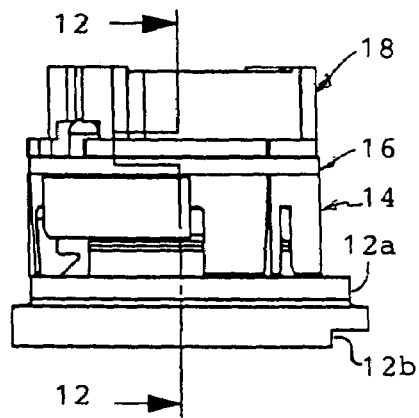
FIG. 11 is a view similar to FIG. 9 but with the assembly rotated 90 degrees.
Figure 10:
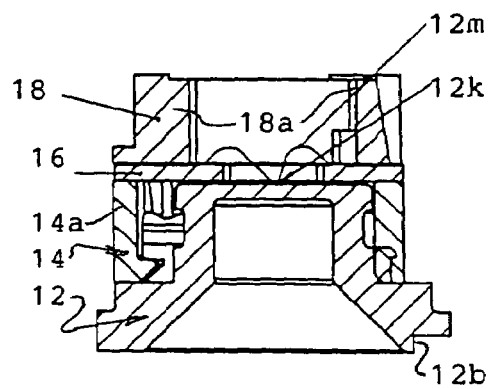
FIG. 10 is a cross section taken on line 10—10 of FIG. 9.
Figure 12:
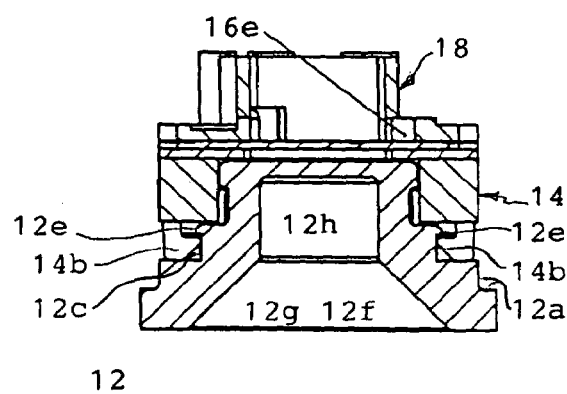
FIG. 12 is a cross section taken on line 12—12 of FIG. 11.
Figure 13:
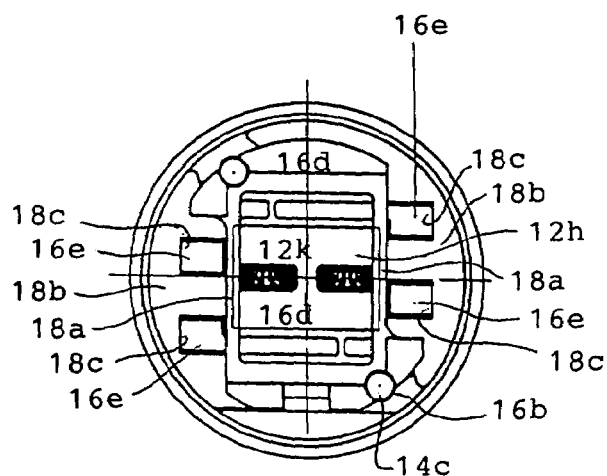
FIG. 13 is a top plan view of the FIG. 10 structure.
Figure 14:
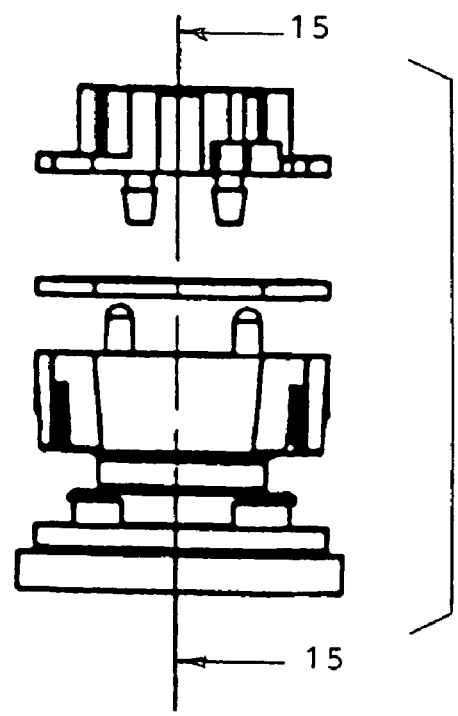
FIG. 14 is an exploded elevational view of the sensing element assembly of FIGS. 9–13.
Figure 15:
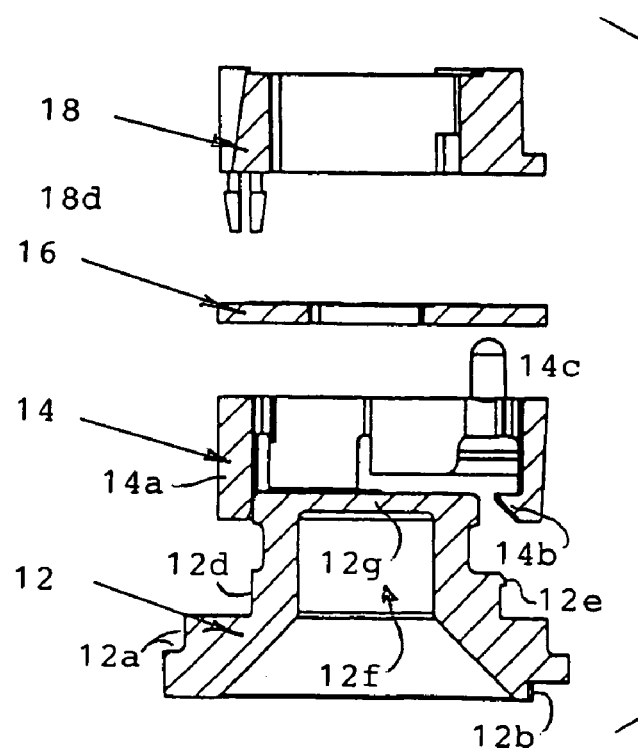
FIG. 15 is a cross section taken on line 15—15 of FIG. 14.

A combination pressure and temperature transducer 10 made in accordance with the preferred embodiment of the invention is shown in FIGS. 1–3. A sensing element 12, see in particular FIGS. 4 and 9–13, formed of suitable material such as stainless steel, is mounted at one end or tip of the transducer and is generally cylindrical for receipt in the end of a probe comprising a threaded pipe 20 formed of suitable material, desirably the same as that of sensing element 12. Sensing element 12 is formed with a cylindrical seating ridge 12a and a flat 12b on its outer periphery to facilitate providing a selected angular orientation. A reduced diameter, axially extending portion 12c is formed with an alignment flat 12d on its periphery and a radially, outwardly extending lip 12e for receipt of a lower support ring catch 14b, to be discussed. Sensing element 12 is formed with a cavity 12f defining a flat diaphragm 12g. The upper surface 12h, relative to the orientation in the drawings, has four piezo-resistive strain gauges 12k glass bonded thereto, to be discussed further below.

A lower support ring 14 of suitable heat stakeable plastic material is formed with a side wall 14a on which lip receiving catches 14b are formed. The support ring defines an open central space aligned with diaphragm surface 12h and is formed with pins 14c extending upwardly from the top surface of the ring. The support ring has flat alignment surfaces formed on both the inner and outer peripheries with the outer flat 14d to later align with the inner connector of the sensor, to be discussed, and the inner flat to align with sensing element 12. A first, lower, heat resistant printed circuit board (PCB) 16 is received on top of the support ring with heat stakes 14c received through respective apertures 16b having a complimentary alignment flat 16a on its outer periphery is received on top of support ring with heat stakes 14c received through respective apertures 16b for attachment of the PCB. PCB 16 is also formed with a central opening 16c aligned with diaphragm surface 12h and, together with the four strain gauges, form a Wheatstone bridge with which it is possible to measure temperature and pressure. PCB 16 comprises contact pads including wire bond pads 16d to make electrical connection with the strain gauges on diaphragm 12g and landing pads 16e for the contact pins of the inner connector.

A gel dam 18 is received on top of PCB 16 and includes a side wall 18a defining a central opening aligned with diaphragm surface 12h and a bottom wall 18b extending radially outwardly from side wall 18a on two opposed sides and formed with a pair of contact pin receiving openings 18c on each of the two opposed sides. Split locking pins 18d project downwardly from bottom wall 18b for locking receipt through apertures in PCB 16 and support ring 14. The function of the gel dam is to provide a well for the placement of gel around the wire bond structure while also providing a physical barrier between the wire bond pads 16d and the landing pads 16e for the contact pins of the inner connector. The wire bond pads 16d within the opening defined by side wall 18a need to be covered in silicone gel while the landing pads 16e need to stay free of gel.

Figures 16, 17:
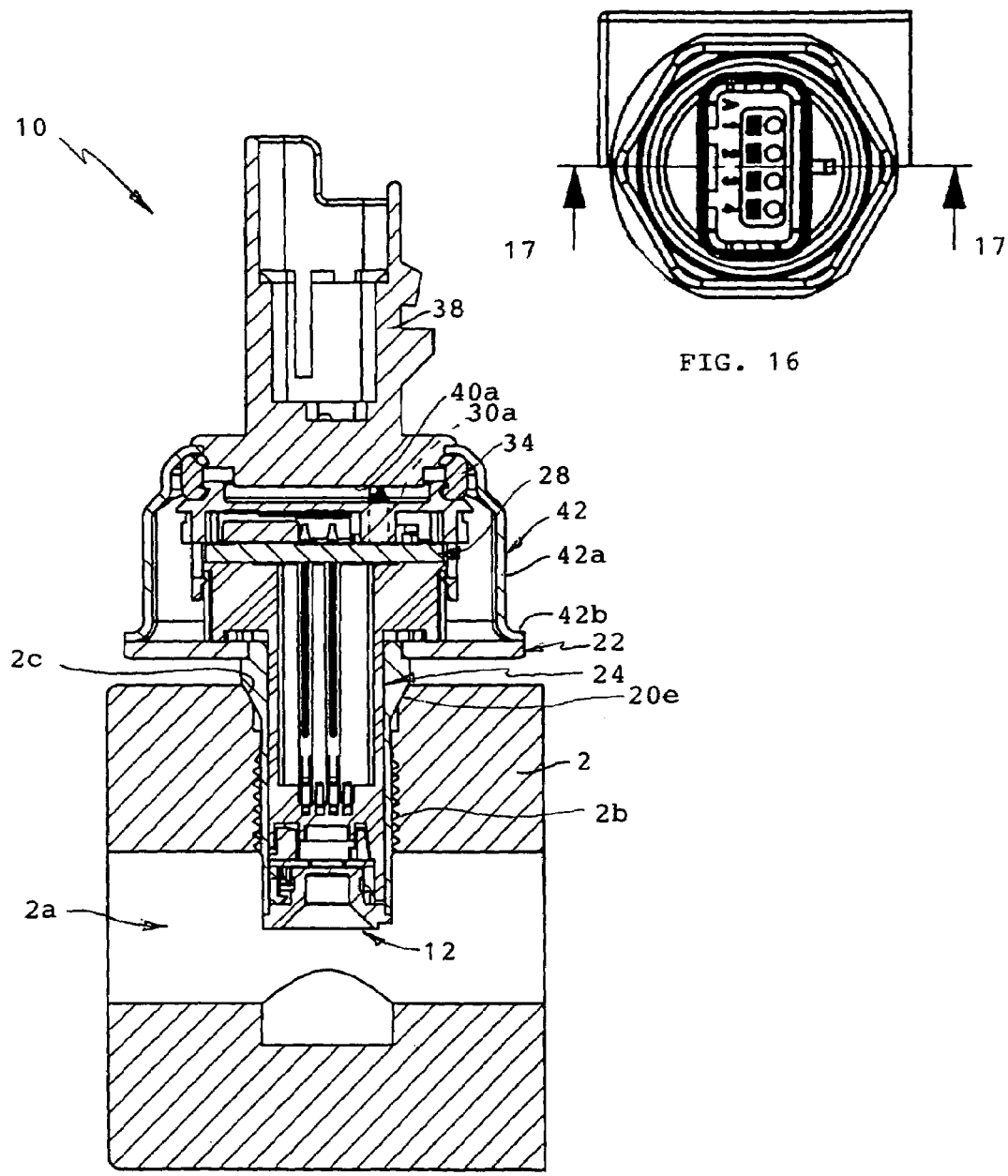
FIG. 16 is a top plan view of the FIG. 1 transducer mounted on a conduit defining a gas flow path, also in cross section.
FIG. 17 is a cross section taken on line 17—17 of FIG. 16.

The sensing element assembly, comprising sensing element 12, lower support ring 14, first PCB 16 and gel dam 18, is received in open end 20a of a probe or pipe 20. Ridge 12a of the sensing element is slid into end 20a of the pipe and welded thereto to form a gas tight seal. An external threaded portion 20c is formed on pipe 20 intermediate to its ends 20a, 20b for assembly of the transducer in a threaded bore of a conduit in which the temperature and pressure of a gas, or other fluid, is to be monitored, such as shown in FIG. 16. A stepped cylindrical ridge 20d is formed at end 20b of the pipe for receipt of a flange 22 and a frusto-conical outer surface 20e is formed between threaded portion 20c and ridge 20d. Flange 22 is a generally circular plate formed with alignment flats 22a which are used for alignment with flat 12d of the sensing element during assembly.

Inner connector 24 comprises an elongated electrically insulative body of suitable high temperature material in which four axial strain absorbing contact members 26 in the form of elongated leaf springs are inserted. The contact members have a strain absorbing, generally U-configured loop 26a at a selected location between opposed ends 26b, 26c. End 26b is preferably bent back into a generally U-shaped contact configuration which is received through a respective aperture 18c in the gel dam for biasing engagement with respective landing pads 16e while end 26c is prong shaped for soldering and/or press fit into respective apertures in a second, upper printed circuit board (PCB) 28, to be discussed. Inner connector 24 is formed with an upper elongated diameter hub portion 24c on top of which second PCB 28 is received. Inner connector 24 has an alignment feature 24d for facilitating alignment with support ring 14 so that elongated contact members 26 make electrical engagement between respective landing pads on first PCB 16 and contact pads on second PCB 28 to which respective contact members are connected frictionally or by soldering. Second PCB 28 mounts an ASIC (not shown) and various associated passive components for conditioning and amplifying the sensor signals and includes interconnecting conductive paths and four spaced apart helical spring contact member receiving landing zones 28a.

A cover 30 is used to mount four helical spring contacts 32 in longitudinally extending cavities 30a of the cover alignable with contact landing pads 28a and an annular seal seat 30b is formed on the top of cover 30 adjacent to its outer periphery. Elastomer environmental O-ring seal 34 is received on seat 30b. Before assembling cover 30 onto the transducer, a generally cup shaped EMC shield 36 is received in a chamber formed on the lower surface of the cover. Generally radially outwardly extending tabs 36a of EMC shield 36 project through openings 30d formed in side wall 30e of cover 30 beyond the outer periphery of side wall 30e. Cover 30 is then turned over with the side wall portions of the cover locking onto the hub portion 24c. The electrical coil spring contacts 32 are placed into their respective cavities 30a with one end protruding beyond the top surface of the cover to make contact with folded over terminal ends of insert molded terminals 40 in outer connector 38. Bent over portions 40a serve as landing zones which are biased against the spring contacts. Outer connector 38 includes an insert molded, metallic housing portion 42 having a polygonal, e.g., hexagonal, outer periphery 42a formed with a radially, outwardly extending lip 42b. The outer connector and housing are placed over the assembly with the EMC shield tabs 36a biased into electrical engagement with metal housing 42 and connector 38 applying a selected load to elastomer O-ring 34 with the housing being welded around its lower periphery at lip 42b to flange 22 to form a fluid seal and to maintain the loading on the elastomer seal.

The arrangement of the cover, helical spring contact members, seal, connector and housing is shown in more detail in U.S. Pat. No. 6,742,395, referenced above.

With particular reference to FIG. 17, transducer 10 is shown mounted on a conduit 2 in which a gas flow path 2a is defined. Conduit 2 has a threaded bore 2b for threaded reception of threaded portion 20c of pipe 2. The entrance 2c of bore 2b is formed with a frusto-conical surface complimentary to frusto-conical surface 20e of pipe 20 to thereby form a gas tight seal when transducer 10 is threaded into the bore. It will be noted from FIG. 17 that sensing element 12 is disposed well within the gas flow path 2a for optimum monitoring of pressure and temperature of the gas flow.

Although the invention has been described with regard to a specific preferred embodiment thereof, variations and modifications will become apparent to those of ordinary skill in the art. For example, it is within the purview of the invention to use axial strain absorbing contact members other than leaf springs, such as coil springs. It is, therefore, the intention that the appended claims be interpreted as broadly as possible in view of the prior art to include all such variations and modifications.

What is claimed:

1. A combination pressure and temperature transducer particularly adapted for use with high temperature fluid comprising:
   an elongated tubular metallic probe member having first and second open ends and having mounting structure for mounting the probe member in a bore of a side wall of a conduit defining a fluid flow path,
   a metallic sensing element defining a pressure sensitive diaphragm received at and closing the first end of the probe member, piezo-resistive strain gauges bonded to the diaphragm within the probe member,
   a first heat resistant printed circuit board (PCB) mounted on the probe member adjacent to the sensing element, the first PCB having electrical circuit paths and the strain gauges wire bonded to the electrical circuit paths to form a Wheatstone bridge,
   an inner connector mounted in the tubular probe member and extending out beyond the second end of the probe member to an upper end,
   a second printed circuit board (PCB) disposed at the upper end of the inner connector, the second PCB having electrical circuit paths and mounting signal conditioning and amplifying electronics,
   the inner connector including a plurality of elongated, axial strain absorbing contact members, each contact member having a first end portion electrically engaging electrical circuit paths of the first PCB, and a second end portion electrically engaging electrical circuit paths of the second PCB, and
   an outside connector and housing assembly to which the probe member is attached forming an enclosure for the second PCB and providing an electrical interface with the transducer.

2. A combination pressure and temperature transducer according to claim 1 in which the mounting structure comprises a threaded portion disposed intermediate to the first and second ends of the pipe.

3. A combination pressure and temperature transducer according to claim 2 in which the outer surface of the pipe is formed with a frusto-conical portion adjacent to the second end of the pipe to serve as a fluid seal surface.

4. A combination pressure and temperature transducer according to claim 1 in which the elongated, axial strain absorbing contact members are each configured to include a loop for absorbing changes in length due to changing temperatures.

5. A combination pressure and temperature transducer according to claim 1 further comprising a gel dam having a side wall forming a well enclosing a first portion of the electrical circuit paths of the first PCB to which the wire bonds are attached along with the strain gauges and separating a second portion of the circuit paths of the first PCB to which the axial strain absorbing contact members are engaged, and gel received within the well.

6. A combination pressure and temperature transducer particularly adapted for use with high temperature fluid comprising:
   an elongated tubular probe member having first and second open ends and sealing structure disposed therebetween so that the first end of the tubular probe member can be sealingly inserted though an opening in a wall into a location to be monitored, a radial, outwardly extending flange mounted on the second end of the tubular probe member, a sensing element including a pressure responsive diaphragm with strain gauges mounted thereon, the sensing element received at and closing the first open end, a first heat resistant printed circuit board (PCB) mounted in the tubular probe member adjacent to the sensing element, the first PCB having wire bond pads and contact pads, wires bonded to the strain gauges and to the wire bond pads forming an electrical connection therebetween,
   an elongated inner connector formed of electrically insulative material received in the tubular probe member, the inner connector having an upper end extending out of the second end of the tubular probe member,
   a second printed circuit board (PCB) mounted on the inner connector at the upper end thereof, the second PCB having electrical circuit paths and contact pads and including electronic signal conditioning and amplifying components, the inner connector including a plurality of elongated, axial stress absorbing contact members having first and second opposite ends, the first end of each contact member in electrical engagement with a respective contact pad of the first PCB and the second end of a respective contact member in electrical engagement with the electrical circuit paths of the second PCB, and an outer connector and housing for attachment to the flange for providing an electrical interface with the transducer and for housing the second PCB whereby the sensing element and first PCB at the first end of the tubular probe member can be sealingly inserted through an opening in a wall into a flow of fluid at elevated temperatures with the second PCB physically separated from the first end of the tubular probe member outside the monitored location.

7. A combination pressure and temperature transducer according to claim 6 further comprising an external threaded portion disposed intermediate to the first and second ends of the pipe.

8. A combination pressure and temperature transducer according to claim 7 in which the sealing structure comprises a frusto-conical portion formed on the outer surface of the pipe to serve as a fluid seal surface.

9. A combination pressure and temperature transducer according to claim 6 in which the elongated, axial strain absorbing contact members are each configured to include a loop for absorbing changes in length due to changing temperatures.

10. A combination pressure and temperature transducer according to claim 6 further comprising a gel dam having a side wall forming a well enclosing the wire bond pads of the first PCB to which the wire bonds are attached along with the strain gauges and separating contact pads of the first PCB to which the axial strain absorbing contact members are engaged, and gel received within the well.

* * * * *